United States Patent [19]

Hsu et al.

[11] Patent Number: 4,954,152
[45] Date of Patent: Sep. 4, 1990

[54] HIGH STRENGTH OPTICAL FIBER SPLICE

[75] Inventors: Hui-Pin Hsu, Northridge; Soon Jang, Los Angeles, both of Calif.

[73] Assignee: Hughes Aircraft Company, Los Angeles, Calif.

[21] Appl. No.: 286,447

[22] Filed: Dec. 19, 1988

[51] Int. Cl.$^5$ .................... C03C 25/02; C03B 23/207; C03B 6/255
[52] U.S. Cl. ........................................ 65/3.1; 65/3.43; 65/4.2; 65/4.21
[58] Field of Search ................ 65/4.1, 4.2, 4.3, 4.21, 65/3.1, 3.43

[56] References Cited

U.S. PATENT DOCUMENTS 4,557,557 12/1985 Gleason et al. .................... 65/4.2 X

FOREIGN PATENT DOCUMENTS 0168408 9/1984 Japan ..................................... 65/4.1
2105060 3/1983 United Kingdom ................... 65/4.2

OTHER PUBLICATIONS

Simple Method for Permanently Connecting Single-Mode Fibers, Pavlopoulos et al., Applied Optics, vol. 16, No. 6, Jun. 1977, pp. 1466–1468.

Primary Examiner—Kenneth M. Schor
Attorney, Agent, or Firm—R. A. Hays; R. M. Heald; W. Denson-Low

[57] ABSTRACT

Two optical fibers are spliced together to form a single spliced optical fiber. The spliced region is uncontaminated by impurities, and has substantially no loss of optical transmission or mechanical strength as compared to the other regions of the fibers. Splicing is accomplished by removal of the buffer coating, if any, cleaving of the fibers to be spliced to form facing splicing surfaces, careful precleaning of the cleaved fibers in the region adjacent the splicing surfaces, aligning the fibers using optical transmission as the alignment criterion, fusing the fibers together by preheating the region to be spliced, fusing the region, postannealing the spliced region, carefully postcleaning the spliced region, and recoating the spliced region with a UV curable polymer buffer material, if desired. The heating of the fibers to accomplish the fusion is desirably accomplished by a laser such as a carbon dioxide laser.

13 Claims, 2 Drawing Sheets

HIGH STRENGTH OPTICAL FIBER SPLICE

BACKGROUND OF THE INVENTION

This invention relates to optical fibers, and, more particularly, to the splicing of two optical fibers to form a single spliced length of fiber.

Optical fibers are strands of glass fiber processed so that light beams transmitted therethrough are subject to total internal reflection. A large fraction of the incident intensity of light directed into the fiber is received at the other end of the fiber, even though the fiber may be hundreds or thousands of meters long. Optical fibers have shown great promise in communications applications, because a high density of information may be carried along the fiber and because the quality of the signal is less than subject to external interferences of various types than are electrical signals carried on metallic wires. Moreover, the glass fibers are light in weight and made from a highly plentiful substance, silicon dioxide.

Glass fibers are typically fabricated by preparing a cylindrical preform of glasses of two different optical indices of refraction, with a core of one glass inside a casing of a glass of slightly lower refractive index, and then processing the preform to a fiber by drawing or extruding. The optical fiber is then coated with a polymer layer termed a buffer to protect the glass from scratching or other damage. The optical fibers and the buffers may be made with varying dimensions, depending upon their intended use and the manufacturer. As an example of the dimensions, in one configuration the diameter of the glass optical fiber is about 0.005 inches, and the diameter of the fiber plus the buffer layer is about 0.010 inches.

For most applications of optical fibers, it is necessary to be able to splice lengths of two separate optical fibers together to form a single spliced length of optical fiber. The need to splice optical fibers together typically arises when it is necessary to use a length longer than can be made from a single preform, when an existing length of fiber breaks, or when apparatus such as an amplifier is to be incorporated into a length of fiber.

The optical fiber splice must be accomplished so that there is no significant increase in loss of light in the vicinity of the splice, and the spliced fiber has a sufficiently high strength to withstand handling in normal operations such as winding under tension onto a bobbin, or unwinding from the bobbin. Additionally, it must be possible to restore the buffer layer initially on the fibers being spliced, if any.

There have been proposed techniques for splicing optical fibers. In general, these techniques have proved unsatisfactory because of mechanical weakness in the region of the splice that leads to preferential failure near the splice in later service, and the use of cumbersome equipment and noxious chemicals in the splicing operation.

There therefore exists a need for an improved method for splicing optical fibers together, and such spliced fibers. The improved technique should exhibit low light loss and high strength of the spliced region, and have the ability to provide a continuous buffer coating over the spliced region. The splicing method should be amenable to accomplishing large numbers of splices in a safe manner. The present invention fulfills this need, and further provides related advantages.

SUMMARY OF THE INVENTION

The present invention provides a method for splicing optical fibers together to produce a single spliced fiber. The spliced fiber has no significant loss of light in the region of the splice, nor is there a loss of strength. The splicing method permits splicing of fibers with or without a buffer. The approach is adapted for semi-automated splicing of large numbers of pairs of fibers.

In accordance with the invention, a method for splicing together two optical glass fibers to form a single spliced optical glass fiber comprises the steps of cleaving each of the glass fibers to form a splicing face on each fiber, the orientations of the splicing faces being selected so that the two glass fibers may be aligned in a linear opposing fashion with the faces in close contact; precleaning the splicing face and adjacent region of each fiber to remove impurities present on the splicing face and adjacent lateral surface of the fiber, and removing the precleaning residue, if any; aligning the two fibers in a linear opposing fashion with the cleaved faces in a facing relationship to each other, the linear opposing relation being determined by maximizing the light transmitted through the fibers; fusing the two fibers by the steps of preheating the fiber ends to a temperature below the melting point of the glass for a time sufficient to remove impurities and dust on the fiber surfaces and ends, heating the fiber ends to a temperature above the melting point of the glass and simultaneously forcing the fiber ends together to fuse the two fibers into a single length of spliced fiber, and annealing the single length of fiber adjacent to the splice at a temperature below the melting point of the glass for a time sufficient to remove residual stresses; and postcleaning the spliced fiber to remove silica particles and other contaminants remaining on the surface after the step of fusing, and removing the postcleaning residue, if any.

More specifically, in most cases of practical interest the optical fibers to be spliced initially have a buffer coating, and it is desirable to restore a buffer coating across the spliced region of the finished spliced optical fiber. In that event, the preceding description is modified so that a short length of the buffer coating is removed on either side of the faces to be spliced prior to fusing them together, and the buffer coating is reapplied over the region of the splice after fusion is completed.

The method of the invention is structured to avoid the inclusion or retention of contaminants in the vicinity of the splice, and to avoid residual stresses or other artifacts of splicing that might reduce the strength of the spliced joint. It has been found that contamination, residual stresses, and the like are the primary causes of reduced strength and light transmission at the splice, and the present approach minimizes such detrimental effects.

For those cases where a buffer is initially present, it is stripped from the fiber, preferably with hot sulfuric acid or methylene chloride, and any contamination due to the stripping agent is carefully removed, preferably with acetone, before cleaving. Cleaving is accomplished to minimize contamination, and achieve clean, compatible faces for splicing. The preferred cleaving technique utilizes a diamond blade with the fiber resting on a convexly curved surface to achieve a cleaved face that is perpendicular to the cylindrical axis and cylindrical sides of the optical fibers. Before fusing the cleaved faces together, the faces and the adjacent cylindrical surfaces of the fibers are precleaned, preferably by using hot sulfuric acid and then rinsed with reagent grade acetone.

Heating of the fibers to achieve their fusion is preferably accomplished with a laser such as a carbon dioxide laser. The fibers are supported in a linearly opposing fashion and carefully aligned optically so as to minimize the light transmission through the cleaved faces. The ends of the fibers and adjacent regions are preheated at a temperature below the fusion temperature to condition the fibers for splicing by removing contaminants that may be burned off, and adjust for thermal expansion and residual stresses. The heat is increased to fuse the glass as the cleaved ends are forced together with a small force. The joining of the fibers is accomplished when the line denoting the cleaved faces disappears, which usually takes 10 to 20 seconds. The heat input to the spliced region is reduced so that the temperature of the glass is below the fusion temperature, and the glass at and adjacent to the splice is annealed to remove residual stresses that are a prime cause of premature mechanical failure.

The use of a laser is particularly preferred for the heating of the fibers during preheating, fusing, and annealing. The laser provides a heat source that is readily controlled to achieve changes in heat input to the vicinity of the splice, by focusing and defocusing the laser to change the beam size and energy intensity. Its heat is thus provided in a manner that does not require a particular atmosphere, as contrasted to, for example, a hydrogen flame that provides a reducing atmosphere. Such modifying atmospheres may change the structure or composition of the glass fibers being joined, resulting in changes in optical performance or producing harmful contamination. The heating produced by the laser also has a desirable transverse profile, being hottest in a small zone in the center of the beam, which is directed at the fusion zone where the two pieces of fiber are to be fused together, and tapering in a generally Gaussian manner to lower heating in the glass spaced back from the point of fusion. A small heating zone is desirable in joining the composite optical glass fiber, to minimize the likelihood of forming a buckled or warped interface between the core and the casing. The laser and movable fixture that supports the fibers during heating and fusion are also readily controlled by a programmed microprocessor to provide a reproducible sequence for each splice, which may be tailored to yield optimum results.

After fusing is complete, the spliced fiber is again carefully cleaned in a postcleaning operation, preferably by dipping the glass fiber into hydrofluoric acid to remove silica and other impurities on the surface of the spliced fiber, that resulted from the fusing operation. If these sources of defects are not removed, the likelihood of premature mechanical failure is increased. If a buffer coating across the region of the splice is desired, it is preferably applied using a flowable polymer that may be cast around the spliced region and then hardened with ultraviolet light.

A large number of pairs of optical fibers have been spliced using the approach of the invention, producing excellent results as to both optical and mechanical properties of the spliced fiber. The present invention therefore provides an important advance in the art, permitting the splicing of optical fibers in a controllable manner that yields good strength and optical properties. Other features and advantages of the invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
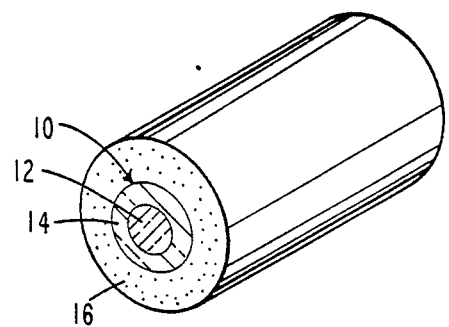
FIG. 1 is a perspective view of an optical fiber having a buffer coating thereon.

FIG. 1 depicts a typical generally cylindrical optical fiber 10, having a core 12 of a glass of a selected refractive index and a casing 14 of a glass having a slightly lower refractive index. The glass used in the core 12 and the casing 14 are of slightly different compositions, and are in most cases silicon dioxide based glasses. A buffer coating 16 of a polymer material such as a UV curable acrylate surrounds the optical fiber 10. By way of illustration and not limitation, for a typical fiber the cylindrical diameter of the optical fiber 10 (that is, the outer diameter of the casing 14) is about 0.005 inches, and the cylindrical diameter of the buffer coating is about 0.010 inches. The preferred embodiment of the present invention deals with splicing two of such fibers 14 in an end-to-end manner, and not the particular structure or materials of construction of the optical fibers and buffer coating, and is not so limited.

Where a buffer coating is present, it is first removed. In the present case, the buffer material is an ultraviolet light curable acrylate. The preferred approach for removing this buffer material is to loop the fiber into a loop about 1-2 inches in diameter, the location from which the buffer coating is to be removed being opposite the crossing point of the fibers. If the fiber is to be joined at a point near its previously existing end, the loop is desirably about 12 inches from the end. The loop is then dipped halfway into liquid methylene chloride at ambient temperature for about 5 minutes to dissolve and strip away the submerged portion of the buffer coating. An alternative, but less preferably approach, is to dip the loop into concentrated sulfuric acid for that is at a temperature below the boiling point, typically about 100° C. Methylene chloride is preferred, however, because it tends to leave less residue on the surface of the fiber. After a length of about an inch of the buffer coating is dissolved and removed, the affected area is immersed in pure acetone at ambient temperature for about 1-3 seconds to remove any impurities or nonvolatile products of the stripping process.

This stripping procedure is contrasted to mechanical stripping procedures which have been used previously. It is important that the glass of the fibers 10 never be contacted by hands, clothing, grit, mechanical instruments, or other tools adjacent to the location of the splice. Such contact may scratch the fiber and reduce its strength. Thus, in the stripping step and in all other steps of the present process, care is taken not to risk scratching the glass of the optical fiber, except where the glass is later fused in the joining operation. However, the buffer coating further from the splice may be gently but firmly grasped with a tool that spreads the force over a relatively large area, to hold the fibers.

After the buffer coating in the region of the splice is removed, each optical fiber 10 is cleaved to create a fresh, precisely defined end for the splicing operation. A preexisting fiber end is preferably not used, as the preexisting fiber end may be chemically contaminated, and almost certainly does not have the required geometry. Preexisting fiber ends may be found where the fiber has broken, or at the end of a spool of fiber.

Figure 2:
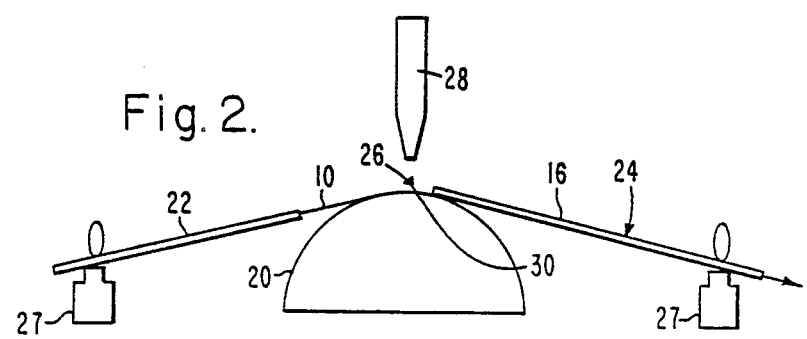
FIG. 2 is a schematic view of the apparatus for cleaving an optical fiber.

The cleaving apparatus, which scores and breaks the fiber under tension, is schematically illustrated in FIG. 2. The previously stripped portion of the fiber 10 is placed onto a concavely curved cleaving surface 20 that is covered with a soft covering that will not scratch the glass of the fiber 10. Teflon tape is the preferred covering material, as it can be readily replaced in the event that grit becomes adhered to the coating. (After the cleaving operation, a length 22 of the fiber 10 is to be discarded, and a length 24 is to be retained for splicing to another piece of optical fiber.)

The optical fiber 10 is positioned so that a length of about 0.1 to about 0.15 inches of the stripped fiber protrudes from the undissolved buffer coating 16 of the retained length 24 to the point of cleaving 26. The fiber 10 is clamped in this position by fiber clamps 27 on either side of the cleaving surface 20, each of which gently grasps the buffer coating with a distributed force that does not adversely affect the fiber. A sharp diamond cleaving blade 28 is moved downwardly to touch the fiber 10 at the cleaving point 26. The downward movement is then continued to cause the fiber to cleave precisely and squarely at the cleaving point 26.

It is preferable that the fiber be cleaved with a square end wherein a cleaved fiber face 30 is perpendicular to the axis of the fiber 10. If the end of the other fiber to be joined is also cleaved with a square end, the two fibers are readily positioned for fusion of the butt joint with the two square ends immediately adjacent to and facing each other. However, angled cleaving is also possible, as long as both ends are cleaved in a compatible manner with the same angle. The joint later formed between the fibers then becomes a partial butt, partial shear joint. The square end, butt joint configuration is preferred for simplicity of handling and uniformity, and also because attaining a uniform heating of an angled joint is more difficult.

The above description details the preparation of one of the fibers to be spliced. The other fiber to be spliced is prepared in the same manner.

Figure 3:
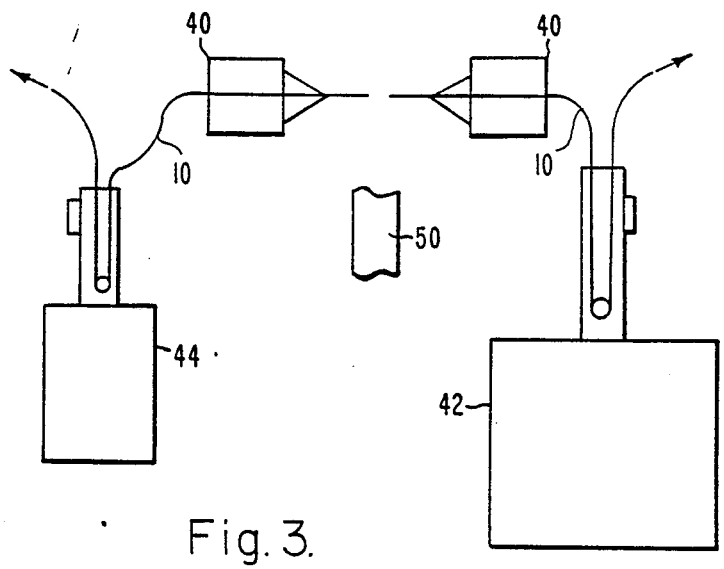
FIG. 3 is a schematic view of the apparatus for optically aligning two fibers for a butt splice.
Figure 4:
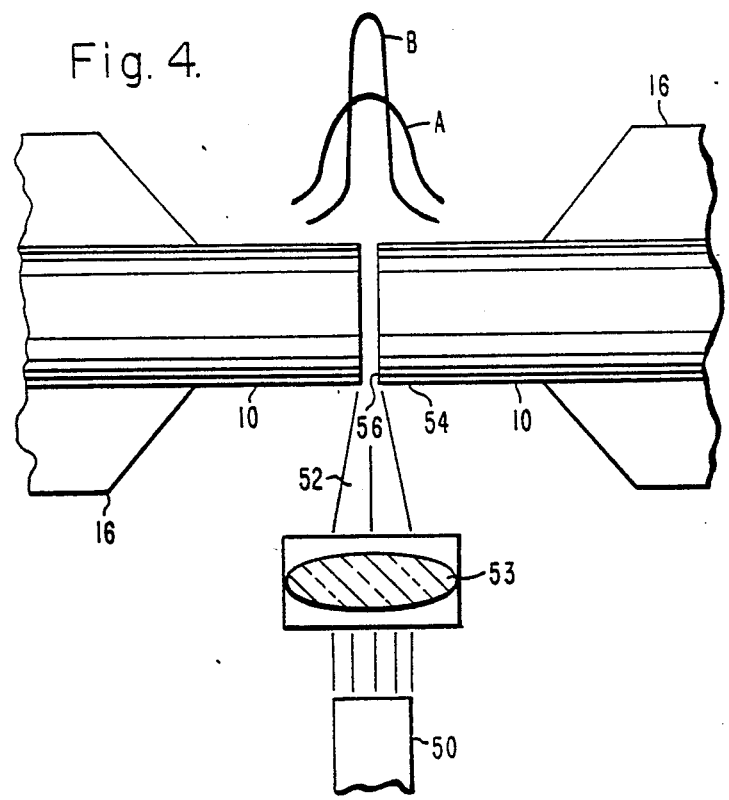
FIG. 4 is a schematic view of the heating pattern of a laser beam in relation to the splice and the optical fibers.

As illustrated in FIGS. 3 and 4, the two optical fibers 10 to be joined are supported with the cleaved fiber faces 30 in a facing relationship. The two fibers are preferably supported in magnetic fiber chuck holders 40, which grasp the buffer coating of the fibers with a distributed load so as not to damage the fibers or the buffer coatings. Preferably, a length of each of the fibers of about 0.5 inches protrudes from the holders 40 for joining.

The ends of the fibers 10 are preferably viewed in a magnifying television system (not shown) during this and the remaining steps of the joining operation. The television view allows the operator to inspect the ends of the fibers to be certain that the ends are squarely cleaved, without splinters extending therefrom or other imperfection. If the cleaved ends are imperfect in any respect, the imperfection may interfere with fiber fusion. In that event, the imperfect fiber must be reprocessed in the previously described steps to remove another section of buffer coating, clean the fiber, and cleave a new cleaved face.

The two fibers to be joined must be aligned in the holders 40 in a linear opposing fashion. That is, the faces 30 must be aligned so that there is a minimum loss of light as it passes from one fiber length to the other. The initial rough alignment may be done visually using the magnifying television system. Fine alignment is achieved using a Local Light Injection (LLI) system of the type depicted in FIG. 3. One of the lengths to be joined is looped through the LLI source 42 and the other length through the LLI sensor 44. A small amount of light is directed into the length in the source 42, as may be done when the fiber is bent into a relatively small radius of curvature. The light transmitted through the alignment region is extracted from the other fiber by the LLI sensor 44 in a similar manner. The two fiber faces 30 are then moved so as to maximize the light received by the LLI sensor 44, at which point the fibers are aligned.

When the alignment of the two lengths of fibers is optimized, the holders 40 are locked into position and the cleaved fiber faces 30 are fused together, as shown in detail in FIG. 4. A focused beam 52 of high intensity light from a laser 50 is directed onto the area of, and adjacent to, the aligned faces 30. For the specific fiber materials discussed in relation to this preferred embodiment, the preferred laser is a carbon dioxide laser operated in the pulsed mode at a maximum power output of about 5 watts. The diameter of the laser beam 52 may be varied in the manner indicated next, but is generally on the order of about 0.05 inches.

The laser beam 52 is directed through a focusing optic 53 so that the spot size may be varied. The optic 53 is first adjusted so that the beam 52 is partially defocused, as represented by the broad profile A of FIG. 4. The beam intensity is sufficient only to heat the ends of the fiber to a temperature that is below the fusion temperature of the glass, and preferably about 600°–800° C., for a period of about 1–2 seconds. This preheating of the fibers burns off any volatile organics, gases, and impurities that may be found on the cleaved face 30 or on the adjacent cylindrical surface 54 of the fiber 10.

The laser beam 52 is then focused to a smaller spot, as represented by the narrower profile B of FIG. 4, by operation of the focusing optic 53. The resulting higher beam intensity heats the cleaved face 30 and adjacent regions to a temperature sufficient to fuse the glass to a molten state, which is estimated to be about 1500° C., for a period of about 5 to 10 seconds. At the same time, one or both of the holders 40 are operated to force the ends 30 together under a very slight pressure. The progress of the bonding is judged by the disappearance of a dark line initially observed at the fusion point. When the line can no longer be seen, fusion is accomplished.

The laser beam 52 is then again defocused back to a broader spot, generally similar to the profile A of FIG. 4. The optical fibers, now fused into a single length, cool to below their fusion point. The power level is maintained at this level for a maximum of about 20 seconds, which anneals out thermally induced stresses in the fiber lengths adjacent the fusion point.

The laser is then turned off so that the spliced fiber can cool to ambient temperature. The spliced region is inspected visually, and in a properly performed splice there is no evidence of the location of the splice.

As indicated previously, a laser is the preferred heating source for the preheating, fusion, and annealing treatments. The laser beam 52 has an energy profile that is generally Gaussian in shape, indicated by the profiles A and B in FIG. 4. The spot size, or alternatively stated the beam profile, can be readily altered by a controllable optic to tailor the beam to heat to temperatures below and above the fusion point. Because the thermal conductivity of glass is rather low, the same temperature profile is experienced in the glass of the fibers 10. That is, the fibers are heated to a high temperature at and immediately adjacent to the fusion point 56, but at distances more than a few fiber diameters from the fusion point there is little heating of the fiber. The unstripped portion of the buffer coating 16, spaced from the fusion point 56 by 0.5 inches or less, is not affected by the heating. The small beam size and narrow heating zone of the laser thus permit the buffer coating to be stripped only a short distance, minimizing the amount of unprotected fiber and the likelihood of scratching of the fiber. Also, the heat distribution minimizes the amount of the core/cladding interface that might be buckled, warped, or otherwise affected by the heating, an important consideration in minimizing the light loss arising due to the splice. Finally, the heat pattern is effective in annealing the glass of the fibers 16 upon completion of fusion.

The laser also has the important advantage that it is clean, does not require the use of a noxious atmosphere, and does not deposit contaminants onto the surface of the fiber. By contrast, if a flame in an oxygen deficient environment were the heat source, carbon particulates could be deposited onto the surface. Such contaminants are believed to be a major source of optical and mechanical degradation of the fibers in prior approaches to optical fiber splicing.

Other heating sources such as a reducing flame or arc welder could be used. They are, however, less precise in their heating pattern and would normally require a greater length of buffer-stripped fiber.

After the single fused fiber length is formed, the exposed glass fiber surface is cleaned to remove silica particles and other contaminants that may have resulted from the heating and fusing operation. To accomplish the cleaning, the exposed fiber surface is preferably dipped into a 48 percent concentration hydrofluoric acid solution for about 1-2 seconds and immediately rinsed in acetone to remove the contaminants and acid from the surface of the fiber. If the fiber is dipped into the hydrofluoric acid for a much greater time, there can be an undesirable etching of the fiber surface.

Figure 5:
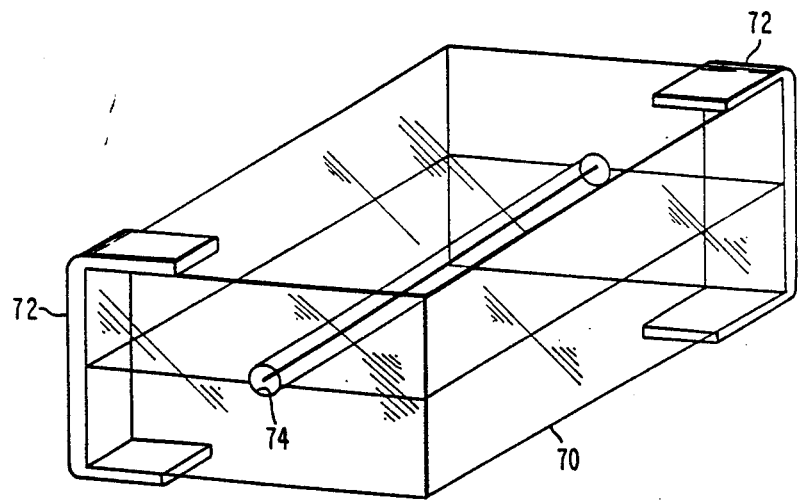
FIG. 5 is a cutaway perspective view of a mold and fixture for applying a polymer buffer coating to a spliced fiber.

The spliced fiber is then recoated with a buffer coating 16, in the regions between the previously unstripped coating material, so that the region of the splice is fully protected against scratching. A mold 70 and fixture 72 suitable for casting a flowable polymer around the fiber 10 is illustrated in FIG. 5. The mold 70 made of transparent plexiglass and is split into two halves, with a matching semicircular recess 74 running across the mating faces of the two halves. When the halves of the mold are assembled, the cylindrical diameter of the recess 74 is identical to the cylindrical diameter of the buffer coating 16. The length of the recess 74 parallel to the cylindrical axis is at least several times longer than the exposed length of fiber that is to be coated, so that a tight mold is formed. In the preferred embodiment, the recess is about 3 inches long, and the exposed length is less than 1 inch, and typically about ¾ inch. The mold is custom manufactured by placing a nichrome wire between two blocks of plexiglass held together in tooling. The nichrome wire has a diameter about 5 percent greater than the buffer coating of the fiber to be coated. A sufficient electrical current is passed through the nichrome wire to heat and soften the plexiglass around the wire, so that the plexiglass pieces may be forced together around the wire. The current is turned off, and the mold halves separated, leaving each with the appropriate recess 74.

To perform the buffer recoating, a layer of a release agent such as polytetrafluoroethylene (teflon) is sprayed on the matching faces. The fiber to be coated is placed into the recess 74, so that the uncoated region is near the longitudinal center of the recess. The unfilled volume of the recess 74 is filled with the flowable, ultraviolet curable polymer that polymerizes to become the buffer coating, in this case a UV curable acrylate. The polymer is cured by directing ultraviolet light of wavelength appropriate to the polymer into the previously uncured polymer, through the transparent walls of the plexiglass mold. The portions of the polymer furthest from the fusion point 56 are preferably cured first, and the curing is continued toward the fusion point by moving the light source around the mold 70. The preferred ultraviolet light source is a mercury lamp with a strong UV output at about 350 nanometers wavelength, and curing is accomplished in a total of about 10 seconds.

The spliced fiber is removed from the mold 70, and inspected for imperfections in the newly cured section of buffer coating. In a properly formed coating 16, the newly added section will be essentially indistinguishable from that supplied with the fiber, except possibly for a slight color difference.

The present invention has been used to prepare several hundred fiber splices. In a sample group of 70 splices using Corning single mode fiber, the average splice strength was about 450,000 pounds per square inch (psi). About one-third of the splices had strengths exceeding 500,000 psi. The fiber splices also had excellent light transmission.

The present invention thus provides a method for splicing optical fibers, and fibers so spliced, yielding properties superior to those available in prior methods. Although a particular embodiment of the invention has been described in detail for purposes of illustration, various modifications may be made without departing from the spirit and scope of the invention. Accordingly, the invention is not to be limited except as by the appended claims.

What is claimed is:

1. A method for splicing together two optical glass fibers to form a single spliced optical glass fiber, comprising the steps of:
   cleaving each of the glass fibers to form a splicing face on each fiber, the orientations of the splicing faces being in a linear opposing fashion;
   precleaning the splicing face and adjacent region of each fiber to remove impurities present on the splicing face and adjacent lateral surface of the fiber, and removing any precleaning residue;
   aligning the two fibers in a linear opposing fashion with the cleaved faces in a facing relationship to each other, the linear opposing relation being determined by maximizing the light transmitted through the fibers;

fusing the two fibers by use of a laser and by the steps of
  preheating the fiber ends to a temperature below the melting point of the glass for a time sufficient to remove impurities and dust on the fiber surfaces and ends,
  heating the fiber ends to a temperature above the melting point of the glass and simultaneously forcing the fiber ends together to fuse the two fibers into a single length of spliced fiber, and
  annealing the single length of fiber adjacent to the splice at a temperature below the melting point of the glass for a time sufficient to remove residual stresses, said preheating, heating and annealing steps being accomplished by changing the focus of said laser; and
postcleaning the spliced fiber to remove silica particles and other contaminants remaining on the surface after the step of fusing, and removing any postcleaning residue.

2. The method of claim 1, wherein the fibers are cleaved by a diamond faced cleaver.

3. The method of claim 1, wherein the fiber ends are cleaved so that the cleaved faces are perpendicular to the length of the fiber.

4. The method of claim 1, wherein the precleaning is accomplished by dipping the fibers into sulfuric acid and removing residue with acetone.

5. The method of claim 1, wherein the step of postcleaning is accomplished by dipping the spliced fiber into hydrofluoric acid and removing the residue with acetone.

6. The method of claim 1, wherein at least one of the fibers to be sliced together is initially covered by a polymer buffer coating, and the buffer coating is removed in the region adjacent the splice prior to the step of cleaving.

7. The method of claim 6, wherein the buffer coating is removed by the steps of
  dipping the buffer with a stripping agent selected from the group consisting of hot sulfuric acid and methylene chloride, and
  removing the residue in acetone.

8. The method of claim 1, including the additional step, after the step of postcleaning, of
  coating the spliced fiber with a coating of a polymer buffer material.

9. A method for splicing together two optical glass fibers having a polymer buffer coating thereon to form a single spliced optical glass fiber having a buffer coating thereon, comprising the steps of:
  removing the polymer buffer coating from each of the fibers in the region adjacent the locations to be spliced together;
  cleaving each of the glass fibers to form a splicing face on each fiber that is perpendicular to the length of the fiber;
  precleaning the splicing face and adjacent region of each fiber to remove impurities present on the splicing face and adjacent lateral surface of each fiber, and removing any precleaning residue;
  aligning the two fibers in a linear opposing fashion with the cleaved faces in a facing relationship to each other, the linear opposing relation being determined by maximizing the light transmitted through the fibers;
  fusing the two fibers by use of a laser and by the steps of
    preheating the fiber ends to a temperature below the melting point of the glass for a time sufficient to remove impurities and dust on the fiber surfaces and ends,
    heating the fiber ends to a temperature above the melting point of the glass and simultaneously forcing the fiber ends together to fuse the two fibers into a single length of spliced fiber, and
    annealing the single length of fiber adjacent to the splice at a temperature below the melting point of the glass for a time sufficient to remove residual stresses, said preheating, heating and annealing steps being accomplished by changing the focus of said laser;
  postcleaning the spliced fiber to remove silica particles and other contaminants remaining on the surface after the step of fusing, and removing any postcleaning residue; and
  coating the spliced fiber with a coating of a polymer buffer material.

10. The method of claim 9, wherein the fibers are cleaved by a diamond faced cleaver.

11. The method of claim 9, wherein the precleaning is accomplished by dipping the fibers into sulfuric acid and removing residue with acetone.

12. The method of claim 9, wherein the step of postcleaning is accomplished by dipping the spliced fiber into hydrofluoric acid and removing the residue with acetone.

13. A method for splicing together two optical glass fibers having a polymer buffer coating thereon to form a single spliced optical glass fiber having a polymer buffer coating thereon, comprising the steps of:
  removing the polymer buffer coating from each of the fibers for a distance of less than about 1 inch back from the locations to be spliced together, by dipping the buffer coating into a stripping fluid selected from the group consisting of hot sulfuric acid and methylene chloride, and removing the residue with acetone;
  cleaving each of the glass fibers with a diamond cleaver to form a splicing face on each fiber that is perpendicular to the length of the fiber;
  precleaning the splicing face and adjacent region of each fiber to remove impurities present on the splicing face and adjacent lateral surface of the fiber with sulfuric acid, and removing the precleaning residue with acetone;
  aligning the two fibers in a linear opposing fashion with the cleaved faces in a facing relationship to each other, the linear opposing relation being determined by maximizing the light transmitted through the fibers;
  fusing the two fibers using the heat of a laser having a generally Gaussian transverse beam energy profile, by the steps of
    preheating the fiber ends to a temperature below the melting point of the glass for a time sufficient to remove impurities and dust on the fiber surfaces and ends,
    heating the fiber ends to a temperature above the melting point of the glass and simultaneously forcing the fiber ends together to fuse the two fibers into a single length of spliced fiber, and
    annealing the single length of fiber adjacent the splice at a temperature below the melting point of the glass for a time sufficient to remove residual stresses;

postcleaning the spliced fiber to remove silica particles and other contaminants remaining on the surface after the step of fusing using hydrofluoric acid, and removing the postcleaning residue with acetone; and coating the spliced fiber with a coating of a UV curable polymer buffer material.

* * * * *